UNITED STATES PATENT OFFICE.

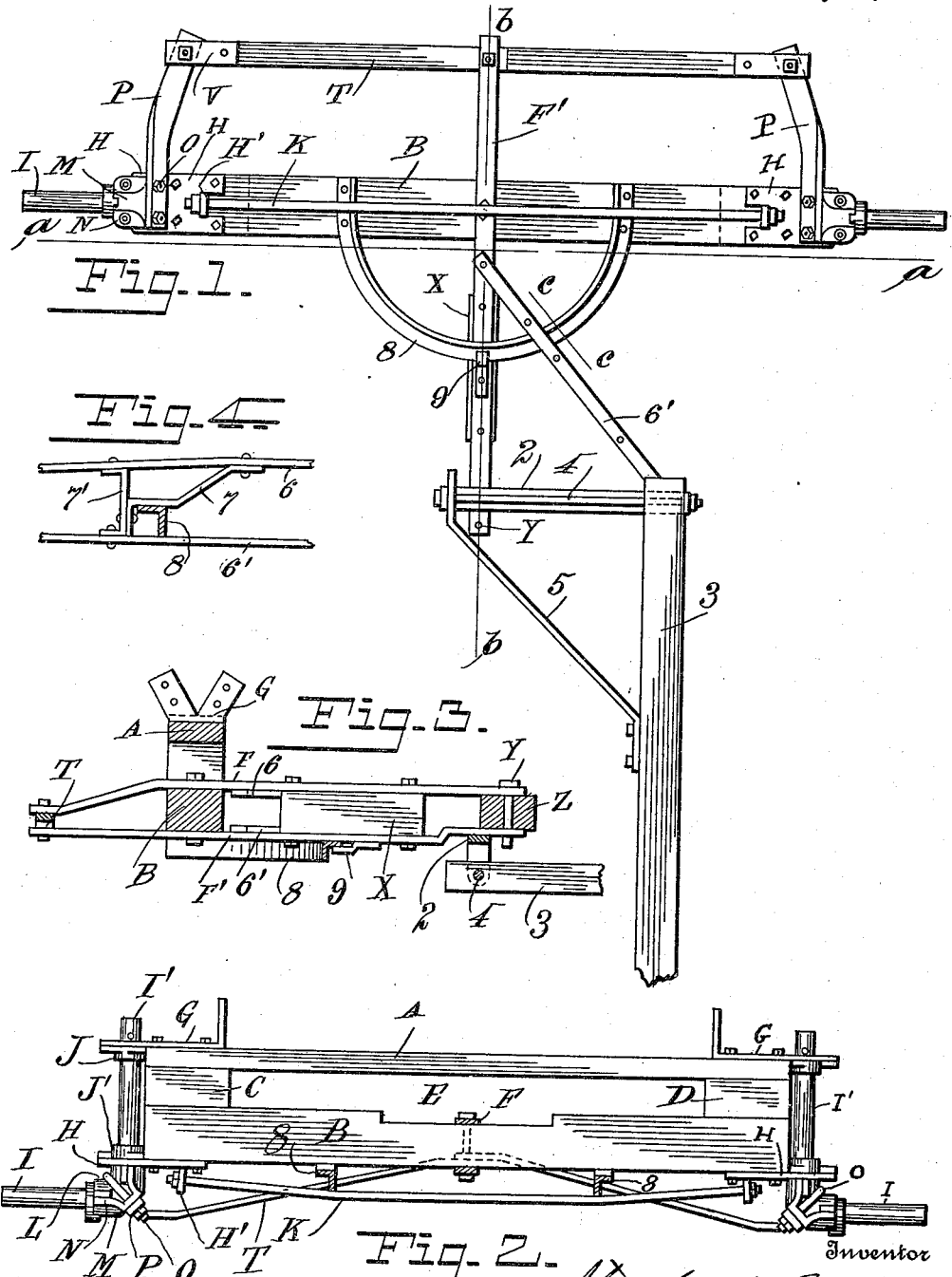

STEPHEN H. GARST, OF MOLINE, ILLINOIS.

MANURE-SPREADER.

1,146,152.

Specification of Letters Patent. Patented July 13, 1915.

Original application filed July 24, 1914, Serial No. 852,927. Divided and this application filed December 29, 1914. Serial No. 879,564.

*To all whom it may concern:*

Be it known that I, STEPHEN H. GARST, a citizen of the United States, residing at Moline, in the county of Rock Island and State of Illinois, have invented certain new and useful Improvements in Manure-Spreaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trucks for manure spreaders and the like.

The improvements to be hereinafter described and claimed are divided from my pending application, Serial No. 852,927, filed July 24, 1914.

The object of the invention is to provide an improved front truck for manure spreaders having the advantage of a low box or body. The body of a low-down spreader is necessarily near the ground and for this reason the front wheels of the truck cannot turn under the body in making a turn and, therefore, it is impossible to make short turns with the usual constructions which employ a swivel front axle. The common practice is to set the front axle far enough ahead of the body so as to allow it to turn without the wheels coming in contact with the body. It is objectionable to so place the front axle ahead of the body because of the fact that a long machine with a long wheel base results and this is inconvenient in getting around barns or barn-yards and for the further fact that the spreader body with the supports so far apart requires a stronger, heavier and more costly construction.

With the above conditions in mind, I will now proceed to describe in detail my improvements and to specifically set forth the same in the annexed claims.

Referring to the accompanying drawings which illustrate the same, Figure 1 is a bottom plan view of a front truck constructed in accordance with my invention; Fig. 2 is an elevation on the line *a—a* of Fig. 1; Fig. 3 is an enlarged sectional elevation on the line *b—b* of Fig. 1; and Fig. 4 is an enlarged detail view on the line *c—c* of Fig. 1.

In a detail description of the said improvements, similar reference characters denote corresponding parts both in the drawings and the description.

The truck consists of a bolster comprising two members A and B which are separated at their ends by spacing-blocks C and D securely bolted to the bolster member B and serving to strengthen the structure. The space between said bolster members forms a passage for the lower run of the movable bottom of the spreader (not shown) and also strengthens the structure by forming a truss. The intervening space E provided in the bolster member B provides space in which the pivot bar F, to be again referred to, may move without coming in contact with the movable bottom of the spreader. Both ends of the bolster are provided with upper and lower brackets G and H. The brackets G are split and turned up at right angles at their inner ends to provide for securing the sills of the body thereof. The outer ends or horizontal portions of said brackets G are each reinforced by a collar or apertured boss J which is riveted to the under side thereof. These collars or apertured bosses J are provided each with a square flange or rib which abuts against the end of the top bolster member A. The vertical parts I' of axles I are received by the brackets G and apertured bosses J, and the abutting flanges of said brackets are adapted to receive the inward thrust of the vertical parts of said axles and to thus relieve bolts that secure said brackets from undue stress. The collars or apertured bosses J also serve to increase or strengthen the bearings in the brackets for said axles and thereby prevent the vertical parts of said axles from cutting under heavy loads, and the same are enabled to pivot with less friction. The lower brackets H are bolted to the lower side of the bottom bolster member B and form supports for the vertical parts of the axles and also bearings which support the ends of the bolster on said axles.

At the inner ends of said brackets H, apertured tongues H' are formed which extend at right angles to the faces of the brackets or nearly so. These tongues H' receive the ends of a truss-rod K which is secured thereto by means of suitable lock-nuts. On the said brackets H, where the vertical parts I' of the axles pass through said brackets, collars or apertured bosses J' are riveted to the upper sides of said brackets. These collars J' are similar in construction to the collars or apertured bosses J of the upper brackets G and are to serve the same purpose, the vertical parts I' of the axles passing therethrough. Each axle is clamped at the bend thereof by two angular castings L and M the former of which is provided with two ears N to which are secured rearwardly projecting arms P. The said clamping members L and M are secured about the angle of the axle by U-bolts O which straddle the clamp member M and pass through the ears N of clamp member L and inclose the arms P, said U-bolts being secured by suitable lock-nuts.

T designates two shiftable bars which connect two rearward ends of the arms P. The outer ends of the said bars T have riveted to them offsets or clips V which form openings for the reception of the ends of said arms P said parts being connected by bolts of large diameters provided with suitable lock-nuts. The connections with the said arms P provide strong and durable joints in which any lost motion can be taken up and the connections held in permanent positions by means of said lock-nuts. The bars T form a joint at their inner ends with the swivel bars F and F', the top bar F being offset sufficiently at the rear end thereof to make a snug joint of the four pieces, as is shown in Fig. 3. This joint is also secured by means of a bolt and lock-nut and the same can be kept in proper adjustment and prevented from working loose.

As will be seen from Fig. 2, the swivel bars F and F' are pivoted to the lower bolster member B. The space between the forward ends of said bars receives a double-tree Z of the hitch, the same being held in position by means of a draw-bolt Y which passes through openings in said bars and double-tree. Between the said bars F and F' near the front is secured a strengthening block X the purpose of which is to stiffen said bars and hold them in place. To the lower side of the front end of the bar F, a cross-bar 2 is secured and extends at right angles thereto. This bar 2 has its ends bent downwardly to receive the base of draft-pole 3 which is secured to the bar 2 by a pivot rod 4 and brace 5. The outer end of the said bar 2 is offset to receive the end of a double brace 6 which extends forward of the outer end of said bar 2.

A circle iron 8, preferably made of angle steel, is bolted to the bolster member B and is further supported by the truss-rod K which, as before stated, is secured at its ends to the tongues H' of the plate brackets H. The bolster member B is thus greatly reinforced and the truss-rod is free from engagement with any wood part.

Riveted to the under side of bar F' in front of the circle iron 8, is an offset clip 9 which engages the under side of the horizontal flange of said circle iron. This arrangement prevents the draw-bar, consisting of bars F and F', from rising and the bracket 7 resting on the top of the circle iron 8 prevents said draw-bar from bending downwardly when the machine is backed by the horses.

The bracket 7 is riveted to the lower side of the brace 6 and to a distance piece 7' which is riveted to the brace 6 and to the lower bar 6' which, together with the brace 6, forms the double brace secured to the bars F and F'.

As shown in Fig. 1, the pole 3 is placed off the center for a three horse hitch in which case a well known form of three horse equalizer (not shown) may be used instead of the double-tree Z. In placing the pole in this position, the rod 4, which acts as a pivot, is withdrawn and the pole turned over to such position and the said rod replaced. In the case of the two horse hitch, it will be understood the pole 3 is in alinement with the draw-bar consisting, as before stated, of the bars F and F'.

Having described my invention, I claim.

1. In a front truck of the type specified, the combination with a bolster, and draw-bar members pivoted thereto, and a circle iron secured to said bolster, of a cross-bar, brace members secured to said draw-bar members and cross-bar and straddling said circle iron, and means secured to said brace members engaging the upper side of the circle iron and serving to prevent the draw-bar members from bending downwardly, substantially as specified.

2. In a front truck of the type specified, the combination with a bolster, draw-bar members pivoted thereto, and a circle iron secured to said bolster below said draw-bar members, of a bifurcated brace attached to said draw-bar members and straddling said circle iron, and a bracket secured in said bifurcated brace and engaging the upper side of said circle iron, substantially as specified.

3. In a front truck of the type specified, the combination with the bolster members A and B, of draw-bar members F and F' pivoted to the bolster member B, a circle iron secured to the bolster member B below the draw-bar members, an offset clip 9 secured to the draw-bar member F and overlapping the lower side of the said circle iron, a double brace 6 and 6' straddling said circle iron and attached to said draw-bar members F and F', and a bracket secured in said double brace and engaging the upper angle of said circle iron, substantially as specified.

In testimony whereof I affix my signature, in presence of two witnesses.

STEPHEN H. GARST.

Witnesses:
S. E. ARNOLD,
HUBERT BURGIS.

Copies of this patent may be obtained for five cents each, by addressing the "Commissioner of Patents, Washington, D. C."